4088X
A. Tanner.
Marine Railway
Patented Apr. 15, 1825.
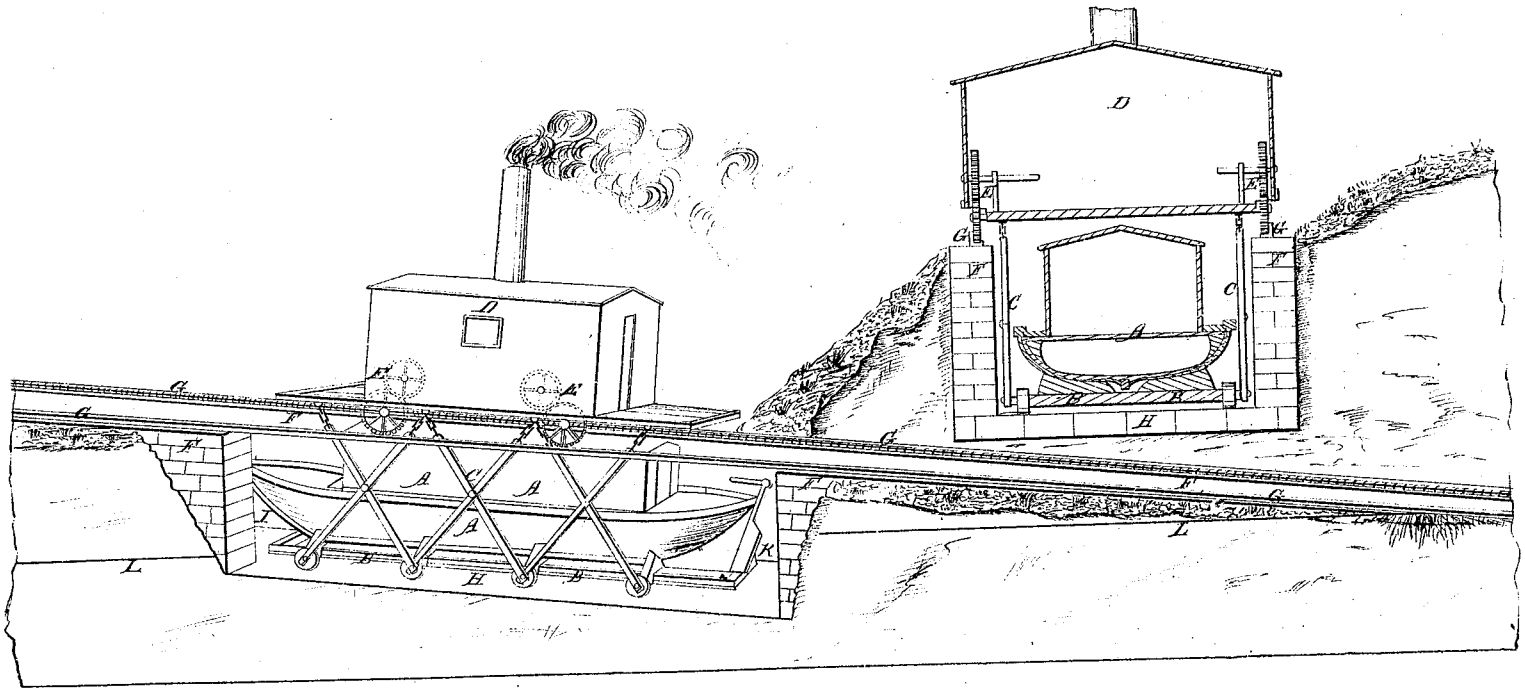
N. PETERS, PHOTO-LITHOGRAPHER, WASHINGTON, D. C.

4088X
A. Tanner.
Inclined Railroad.
Patented Apr. 15, 1825.
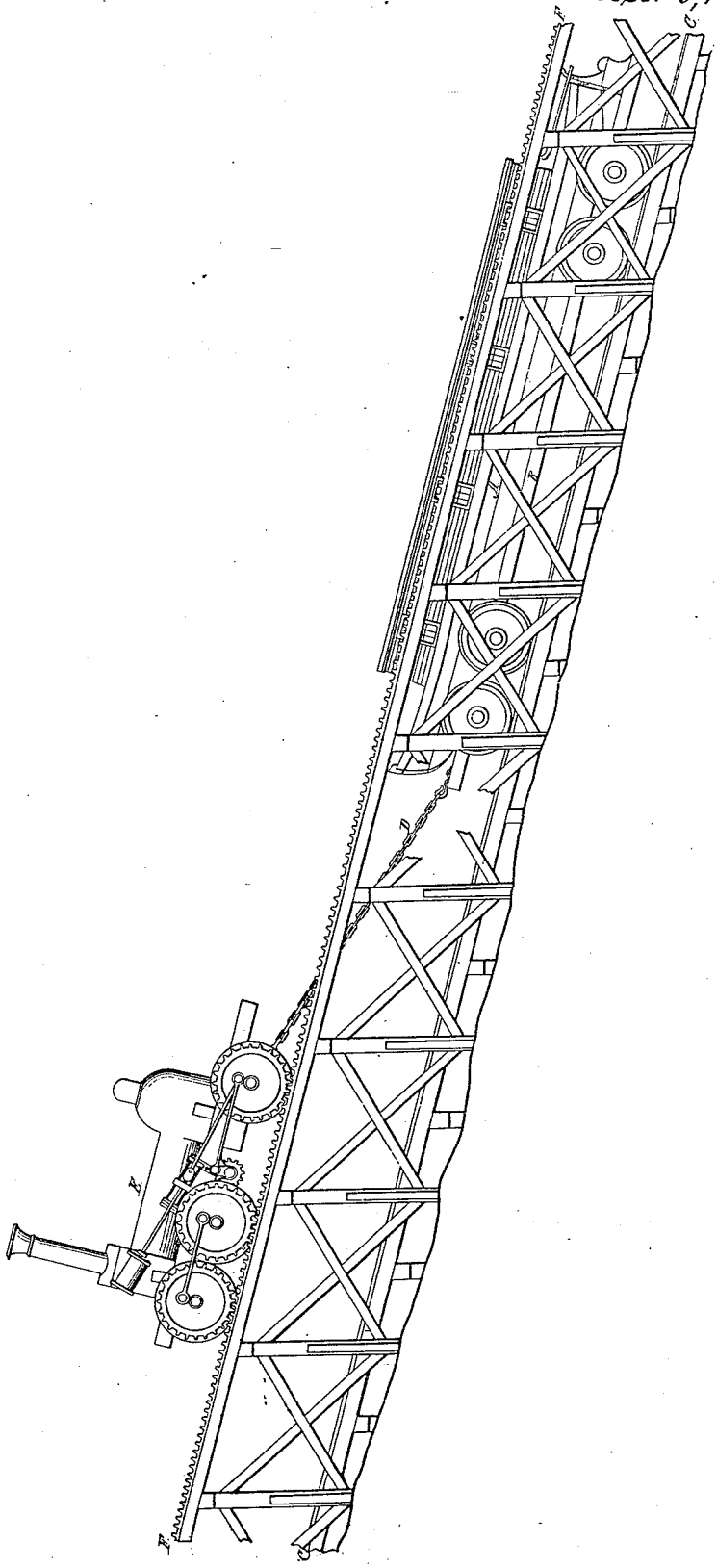
THE GRAPHIC CO. PHOTO-LITH. 39 & 41 PARK PLACE, N.Y.

United States Patent Office

PTO - BOYERS, PA Duty Station

MISSING PAGE TEMPORARY NOTICE

PATENT # 4088X FOR ISSUE DATE 4-15-1825

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Pg. 3 thru end

Data Conversion Operation

Boyers, Pa